(12) United States Patent
Jorden et al.

(10) Patent No.: US 8,762,725 B2
(45) Date of Patent: Jun. 24, 2014

(54) SECURE MACHINE-TO-MACHINE COMMUNICATION PROTOCOL

(71) Applicant: Caterpillar Inc., Peoria, IL (US)

(72) Inventors: Caleb M. Jorden, Peoria, IL (US); Robert F. Schulz, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/656,233

(22) Filed: Oct. 19, 2012

(65) Prior Publication Data

US 2014/0115335 A1    Apr. 24, 2014

(51) Int. Cl.
*H04L 29/06* (2006.01)
*G07C 5/00* (2006.01)

(52) U.S. Cl.
CPC ............ *H04L 63/0869* (2013.01); *H04L 63/06* (2013.01); *G07C 5/008* (2013.01)
USPC ................................ 713/169; 713/153; 701/1

(58) Field of Classification Search
CPC ..... H04L 63/0869; H04L 63/06; G07C 5/008
USPC ........................ 713/169, 153; 701/1
See application file for complete search history.

(56) References Cited

U.S. PATENT DOCUMENTS

| | | | |
|---|---|---|---|
| 7,711,842 B2 | 5/2010 | Liu et al. | |
| 7,715,961 B1 | 5/2010 | Kargupta | |
| 7,856,294 B2 | 12/2010 | Van Gaasbeck et al. | |
| 8,533,018 B2 * | 9/2013 | Miwa et al. | 705/7.13 |
| 2003/0226010 A1 * | 12/2003 | Arima et al. | 713/150 |
| 2007/0067582 A1 * | 3/2007 | Kakizawa et al. | 711/154 |
| 2007/0142990 A1 | 6/2007 | Moughler et al. | |
| 2008/0291918 A1 | 11/2008 | Turcot | |
| 2009/0212928 A1 * | 8/2009 | Aijaz | 340/426.1 |
| 2010/0161172 A1 | 6/2010 | Bjelkstal | |
| 2011/0258044 A1 | 10/2011 | Kargupta | |
| 2013/0073605 A1 * | 3/2013 | Fosburgh et al. | 709/202 |

* cited by examiner

*Primary Examiner* — Michael Pyzocha
(74) *Attorney, Agent, or Firm* — Miller, Matthias & Hull (57) ABSTRACT

A task list server supports secure asynchronous communications between both a workstation and one or more machines. The task list server stores requests and responses initiated by either side and establishes secure communication channels used to forward the data between parties. The communication between workstation and machine may be delayed by hours or even days, depending on the work schedule and network access of both the workstation operator and machine. The machine may process requests in order from highest priority to lowest priority and from oldest to newest. Public key encryption may be used to establish secure channels between the task list server and the workstation or the one or more machines using a combination of certificate authorities including both manufacturers and owner/operators.

20 Claims, 7 Drawing Sheets

Fig. 3
Task list server

Fig. 4
Workstation

Fig. 5
Machine

SECURE MACHINE-TO-MACHINE COMMUNICATION PROTOCOL

TECHNICAL FIELD

The present disclosure relates to communication between intermittently connected devices, and more specifically to a protocol for secure communications between field equipment and a computer server.

BACKGROUND

Field equipment, or more simply, machines, such as earthmoving equipment, mining equipment, fixed installation generators, etc., are increasingly outfitted with programming and monitoring capabilities. By nature, however, such equipment is subject to both intermittent operation and intermittent network access so that reliable access to the equipment for exchange of relevant data is difficult.

SUMMARY OF THE DISCLOSURE

In a first embodiment, a system for securely communicating requests and responses between a workstation and a machine uses a task list server that includes the machine that is communicatively coupled to the task list server and that receives, from the task list server, an instruction corresponding to a request from the workstation, the instruction being a task instruction or a status instruction corresponding to the request. The machine may develop a response to the instruction without human operator intervention. The system may also include the task list server having executable instructions that when executed by a processor causes the task list server to establish a first communication session between the task list server and the workstation, the first communication session being mutually authenticated and encrypted. The first communication session communicates the request from the workstation to the task list server and the request includes at least one of a task or job request or a status request. Asynchronously to the first communication session, a second communication session may be established between the task list server and the machine, the second communication session is mutually authenticated and encrypted. The second communication session communicates the response to the instruction from the machine to the task list server.

In another embodiment, a system for securely communicating requests and responses between a workstation and a machine includes a task list server that has a server processor and a communication port coupled to the server processor. The communication port supports secure and authenticated session-based communications between the task list server and the workstation and between the task list server and the machine. The task list server also includes a memory configured to store operational data, keys, and executable commands for execution on the server processor that cause the task list server to store data and communicate data traffic over the communication port. The system also includes a machine that has a machine processor, a machine communication port coupled to the machine processor and is communicatively coupled to the communication port of the task list server. The machine further includes a memory configured to store executable commands for execution on the machine processor that implement i) a communication routine that receives an instruction from the task list server, ii) a queue storing the instruction received from the task list server and a response to the instruction for sending sent to the task list server, and iii) a dispatch routine that causes the instruction to be executed and determines the response to the instruction.

In yet another embodiment, a method of asynchronous communication between a plurality of workstations and a plurality of machines using a task list server includes establishing a first communication session between the task list server and a workstation, receiving, at the task list server, a request from the workstation, where the request includes at least one of a status request for a status at one or more of the plurality of machines or a job request to be executed at the one or more of the plurality of machines and storing the request in a queue at the task list server. The method further includes establishing a second communication session between the task list server and a one machine of the plurality of machines, determining that the queue has a stored request for the one machine, dispatching, to the one machine, an instruction corresponding to the stored request in the queue, marking the stored request in the queue as pending, and disconnecting the second communication session. The method may also include establishing a third communication session between the task list server and the one machine, receiving from the one machine a response to the instruction, storing the response in the queue at the task list server, and sending, from the task list server to an authenticated workstation, a status message corresponding to the response stored in the queue.

DETAILED DESCRIPTION

Figure 1:
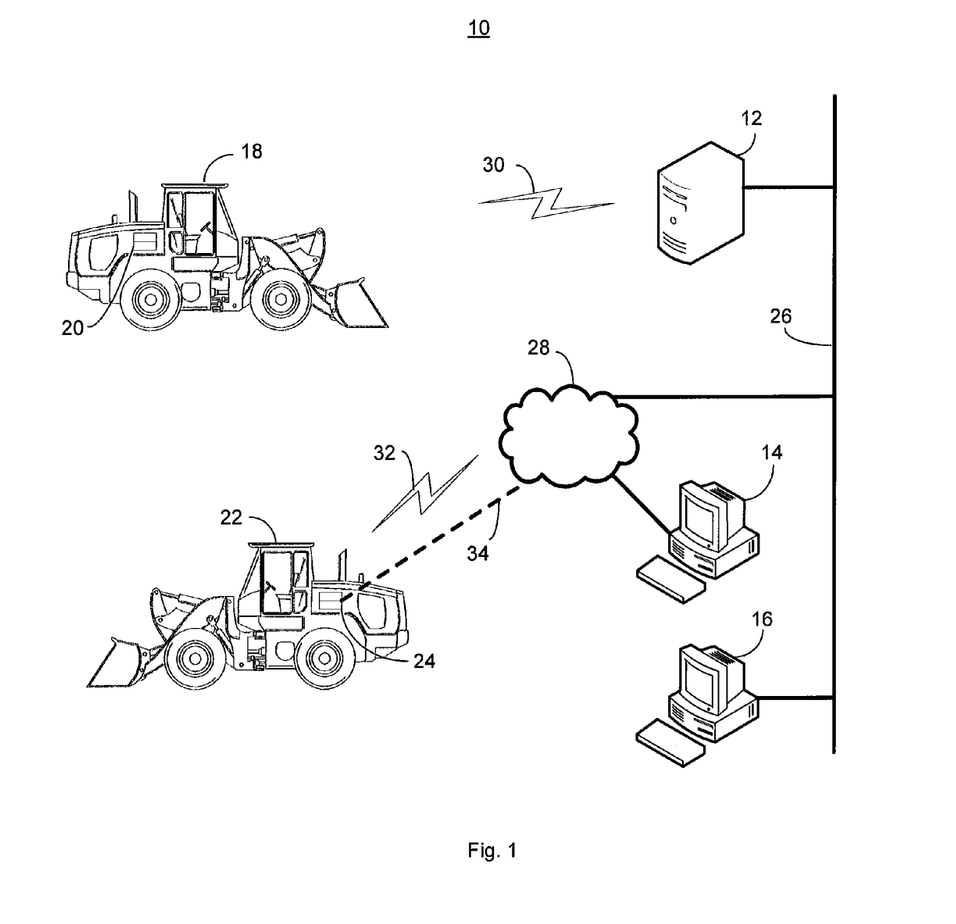
FIG. 1 is a system diagram illustrating components supporting a secure machine-to-machine protocol.

FIG. 1 illustrates a system 10 that supports a secure machine-to-machine protocol. The system 10 may include a task list server 12 and one or more workstations 14, 16. The system 10 may also include a machine 18 that may include a processing module 20. A second machine 22 and its associated processing module 24 are used to illustrate that any number of machines may be supported by the system 10. The task list server 12 and workstation 16 may be connected by a network 26 that may include a public or private local area network. The task list server 12 may be connected to the workstation 14 by a wide area network 28, that may include the Internet. A wireless link 30 may directly connect the task list server 12 to machine 18. Alternatively, the task list server 12 may communicate with a machine, such as machine 22, via a wireless link 32 coupled to the wide area network 28, and may include a cellular telephone network, a satellite network, a private data system, etc. In other embodiments, a hardwired connection 34 may couple the machine 22 to the task list server 12 either via the wide area network 28 or directly with the task list server 12 (not depicted).

Figure 2:
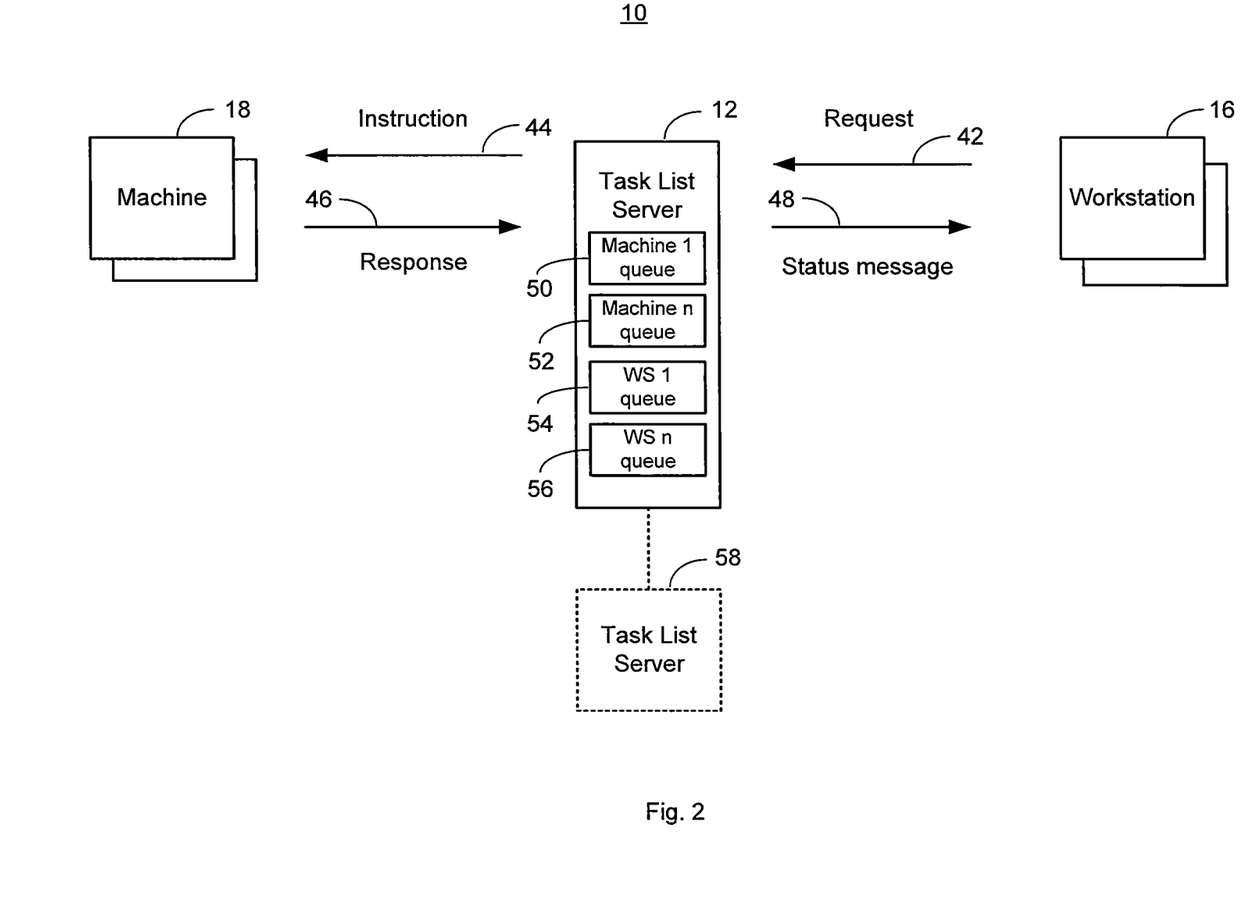
FIG. 2 is a block diagram illustrating message flow in the system of FIG. 1.

FIG. 2 is a block diagram illustrating message flow between elements of the system 10 of FIG. 1. Four general categories of communication are depicted in FIG. 2 representing bidirectional communication between the task list server 12 and workstation 16 or between the task list server 12 and machine 18. It will be understood that a plurality of workstations, task list servers, and machines are supported by the system 10 but for the sake of clarity of illustration the descriptions will generally be confined to a single instance of each element.

Communication from the workstation 16 to the task list server 12 is referred to as a request 42. Communication from the task list server 12 to the machine 18 is referred to as an instruction 44. It is understood that the contents of a particular request 42 and its corresponding instruction 44 may be identical and are at least related, but are separately named for ease of referencing in the following description. Communication from the machine 18 to the task list server 12 is referred to as a response 46. Communication from the task list server 12 to the workstation 16 is referred to as a status message 48. Similarly, it is understood that the contents of the response 46 and the status message 48 may be identical and are at least related but are separately named for the purpose of description.

The task list server 12 may include one or more machine specific queues 50, 52. As described in more detail below, the queues 50, 52 are used to manage communication traffic between workstation 16 and one or more machines, such as machine 18, particularly in view of the intermittent access by the either the workstation 16 or the machine 18. Similar queues 54, 56 for traffic intended for one or more workstations may also be supported at the task list server 12.

One or more additional task list servers 58 may be included in the system for the sake of redundancy, backup, load sharing, etc. In the following description for the sake of clarity, the task list server 12 will be described in the singular with the understanding that one or more task list servers 58 may be used in some embodiments.

Figure 3:
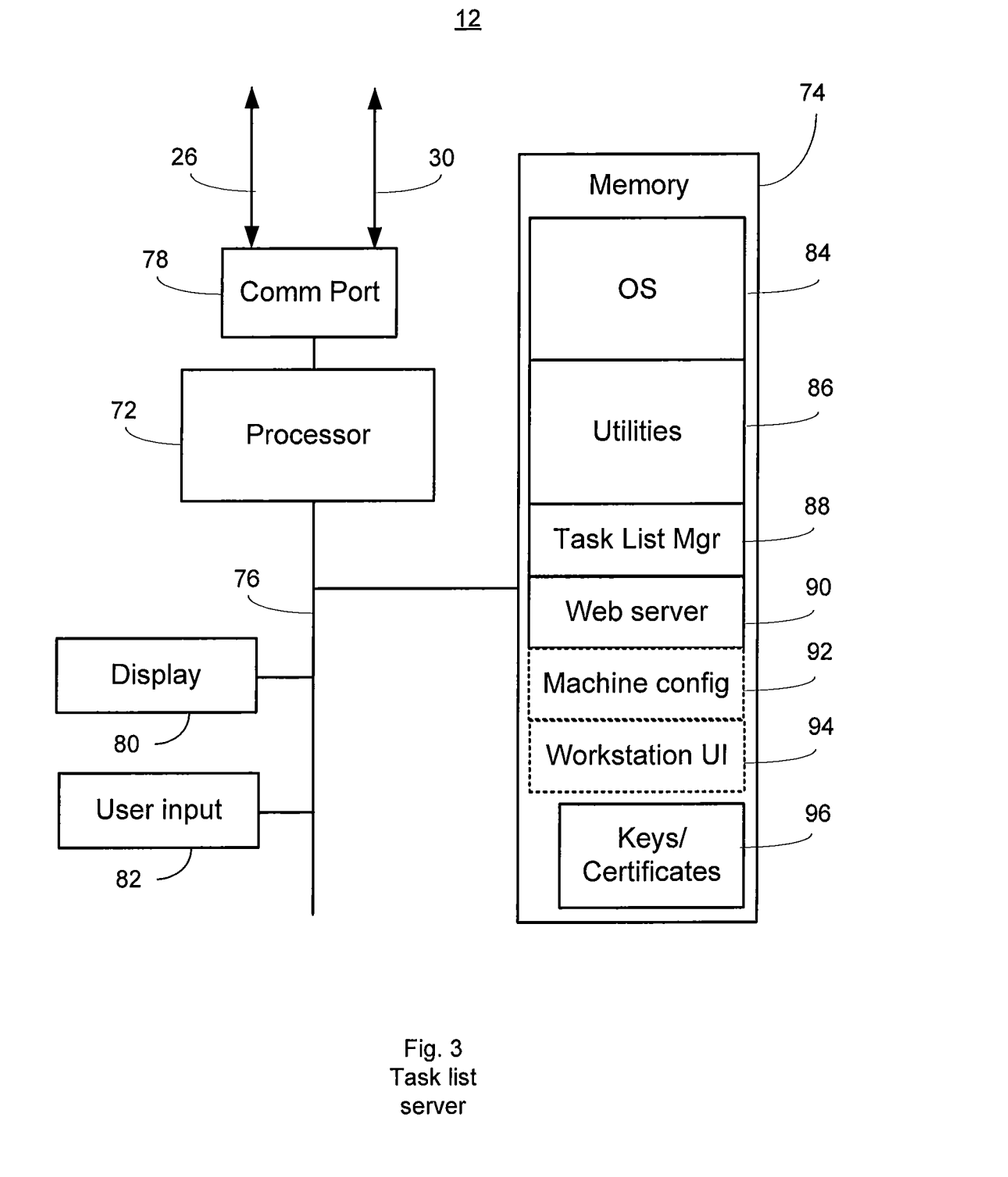
FIG. 3 is a block diagram of an exemplary task list server.

FIG. 3 is a block diagram of an exemplary task list server 12. The task list server 12 may include a processor 72 and a memory 74 coupled by an internal bus 76. The internal bus 76 may further connect the processor 72 to a communication port 78 as well as user interface elements such as a display 80 and user input 82, for example, a keyboard and mouse. The communication port 78 may be coupled to the network 26. As discussed in FIG. 1, the communication port 78 may optionally support communication via a wireless network 30 such as Wi-Fi, Zigbee, etc.

The memory 74 may include one or more modules such as an operating system 84 and utilities 86 that may be used in diagnostics, maintenance, status reporting, etc. The memory 74 may also include one or more modules that when executed by the processor 72 may implement functions associated with secure machine-two-machine communication. These modules may include, but are not limited to, task list management 88, a Web server 90, and optional data such as machine configuration 92 and/or support for a workstation user interface 94. The memory 74 may also include keys and certificates 96 used for secure channel set up, endpoint authentication, and user authentication as required.

Task list manager 88 may include executable code that receives and sends communications between the workstation 16 and the machine 18. For example, in one embodiment, a request may be stored on a machine-specific outbound queue at the task list server 12 and responses may be stored in a workstation-specific outbound queue at the task list server 12. In another embodiment, only machine-specific inbound or workstation-specific inbound queues may be used and the task list manager 88 may query each queue when looking for messages destined for a particular workstation 16 or machine 18. In such an embodiment, communications are stored in queues specific to where the communication came from, rather than queues specific to where the communications are destined, as discussed above. The task list manager 88, or a similar function, may log the date and time of communication sessions with the machine 18 and may flag a machine that is overdue for a communication session either based on previous communication patterns or on a pre-determined schedule.

The web server 90 may offer a web presence to support asynchronous communication between either a machine 18 or a workstation 16. Web services are not the only communication base that is available and others may include remote procedure call (RPC), file transfer protocol (FTP), etc. However, the asynchronous nature of a web service is particularly well-suited to this type of operation.

In embodiments where communication is supported via a web service, a web server 90 may be implemented. The web server 90 may support unsolicited asynchronous communication requests from either the machine 18 or the workstation 16 and may serve web pages or web-based data. In some embodiments, the web server 90, or a utility 86 may support push communications after determining that a target machine 18 or workstation 16 is online and available.

Several optional functions may also be supported. Machine configuration information 92 may be maintained at the task list server 12 for each machine 18 supported. It is expected that each machine type, for example, an earthmover will support a different set of task or job requests and status requests compared to, for example, a power generator. Even within a particular machine type, different models may support slightly different job or status requests. Therefore, it is expected that such a repository of machine-specific configuration information is present somewhere in the system 10. As shown here in FIG. 3, the information may reside in the task list server 12. As discussed below, machine-specific configuration information may be stored in the workstation 16. Alternatively, each machine 18 may store its own configuration information and may supply a list of capabilities in response to a discovery request.

The memory 74 may also store a workstation user interface 94. As is known, there are many options for where the code for a workstation user interface 94 may be stored. As shown here, the workstation user interface 94 may be stored at the task list server 12. The workstation user interface 94 may be embodied in many known formats and when the workstation client is a generic browser may include HTML, Java, or JavaScript. In other embodiments where the workstation user interface 94 is embodied in a different form, such as a thin client or a thick client, the workstation user interface 94 may be a compiled executable code that is downloaded and installed on the workstation 16.

Keys and/or certificates 96 may also be stored in the memory 74 for use in establishing authenticated sessions between the task list server 12 and the workstation 16 as well as between the task list server 12 and the machine 18. The establishment of secure communication sessions may use any of several known techniques and may include Diffie-Hellman key exchange, public and private key pairs using a trusted certificate authority (CA), derived keys based on commonly known shared keys, etc. In some embodiments, more than one CA may be involved, such as a manufacturer CA and an operator CA. In these cases, some form of mutual trust may be established between the CAs. There are two primary reasons, among many, for securing communication between endpoints and for performing authentication and authorization procedures. First, status information regarding operation of a particular machine or machines may represent highly confidential business information that a business would seek to protect from disclosure to a competitor either through direct query or by eavesdropping. Second, and of perhaps greater concern, is protection from potentially malicious access that seeks to disrupt productivity or even sabotage operation by, for example, placing the targeted machine in a maintenance mode.

Figure 4:
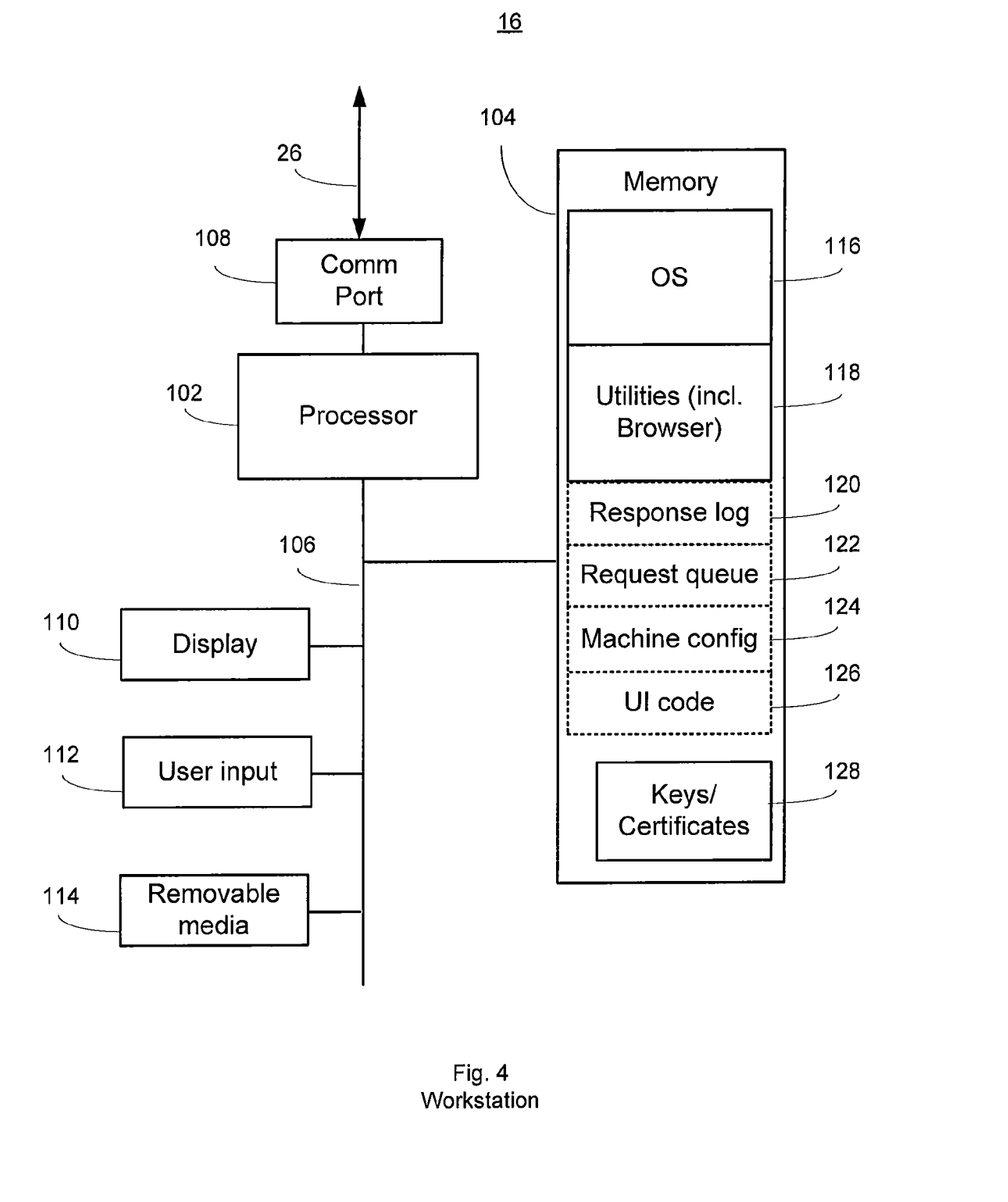
FIG. 4 is a block diagram of an exemplary workstation.

FIG. 4 is a block diagram of an exemplary workstation 16. The workstation 16 may be any conventional computer that for some embodiments supports at least a browser. This may include servers and desktop units as well as laptops, tablets, smart phones etc. The workstation 16 may include a processor 102 connected to a memory 104 by an internal data bus 106. The processor 102 may also be connected to a communication port 108 for use in communication with the task list server 12 via a network, for example, network 26. The workstation 16 may include a display 110 and other user input equipment 112 such as, but not limited to, a keyboard, a mouse, or a touchscreen (not depicted).

In some embodiments, removable media 114 may be used to install various configuration elements to the memory 104, to transport results information, or for data backup. The memory 104 may include an operating system 116, various utilities 118 that may also include a browser, and several optional elements. Particularly in those embodiments where local executable code is stored in the memory 104, those optional elements may include data such as a response log 120, a request queue 122, machine configuration 124, and user interface code 126, although other configurations may be supported.

The response log 120 may include information status message information received from one or more machines, such as machine 18. In some embodiments, previously submitted requests may be stored locally so that an analysis of outstanding requests can be performed locally and/or to allow various metrics to be collected after a particular status message corresponding to a previously submitted request is received. This analysis may include response times, successful completions of task or job requests, etc.

When off-line operation is supported, the request queue 122 may store both job requests and status requests for transmission to the task list server 12 after a network connection with the task list server is established. Machine configuration information 124 may be the same as or similar to machine configuration information 92 found in some embodiments at the task list server 12. In an embodiment, machine-specific configuration information 124 may only be downloaded to the workstation 16 at the time a user expresses an interest in sending a request to a particular machine 18. The user interface code 126 may be downloaded code, such as JavaScript associated with a browsing session, or permanently installed code associated with, for example, off-line generation of task or status message requests that would be communicated to the task list server 12 upon establishment of a network connection. As above, keys and/or certificates 128 may be used to perform authorization, authentication, and transmission security functions.

Figure 5:
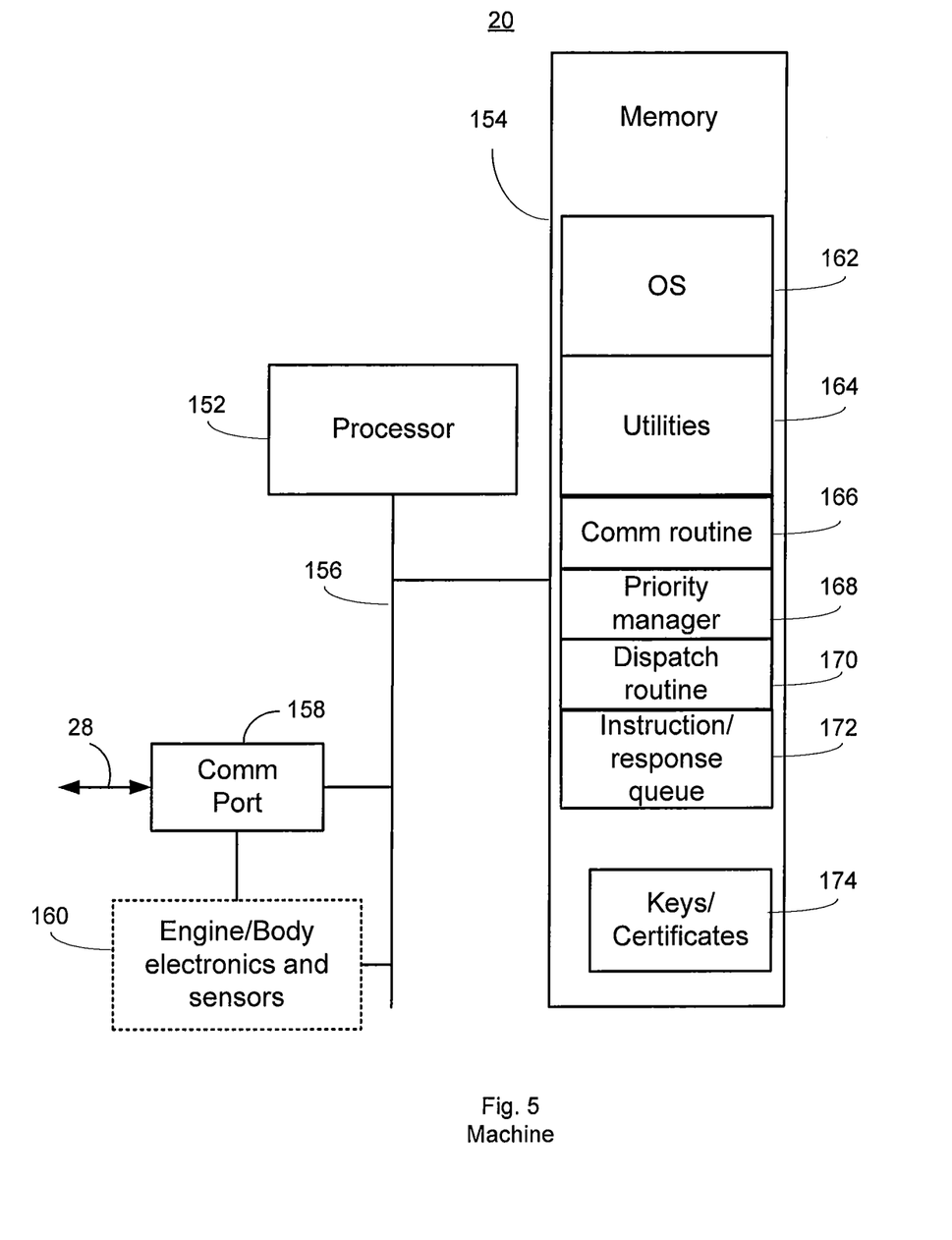
FIG. 5 is a block diagram of an exemplary processing module of a machine.

FIG. 5 is a block diagram of an exemplary processing module 20 of a machine 18. The processing module 20 may include a processor 152 and a memory 154 that is coupled to the processor 152 via a bus 156. Also coupled to the processor 152 via the bus 156 may be a communication port 158 for communication via a network 28 or another similar network.

In an embodiment, one or more engine or body electronics or sensors 160 may be coupled to the processing module 20 either directly to the bus 156, via communication port 158, or via another connection (not depicted). The engine or body electronics or sensors 160 may include engine control modules, chassis control modules, load sensors, temperature sensors, pressure sensors, voltage or current sensors, etc. Communication between the processing module 20 and these various elements of machine 18 may be used to develop responses to instructions received from the task list server 12.

The memory 154 may include, as discussed above, an operating system 162 and utilities 164. The memory 154 may also include a communication routine 166 for use in communicating both between the processing module 20 and the task list server 12 as well as the module 20 and the various engine or body electronics and sensors 160. A priority manager 168 may be used to prioritize the sequence in which instructions received from the task list server 12 are executed, based on a priority associated with a particular instruction, a date and time prioritization, or a combination of the two. In other embodiments, additional prioritization characteristics may be included, such as the time required to develop a response so that a simple data gathering such as a coolant temperature may be performed before a calculated response such as drawbar pull. In another embodiment, execution of an instruction for which there is not enough data may be de-prioritized. To illustrate, a request for work cycle productivity may need to be delayed until the first work cycle is completed.

An instruction/response queue 172 may be used to store instructions received from the task list server 12, to store prioritization information about the instructions, and to store response information pending transmission to the task list server 12. In another embodiment, separate queues (not depicted) may be used for inbound and outbound data. The instruction/response queue 172 may include a time reference (not depicted) for use in logging instructions received for use by the priority manager 168 in prioritizing execution order. Other sources of time may be used. After connection to the task list server, response information stored in an outbound queue may be cleared after a confirmation of receipt message is received from the task list server 12. As discussed above, keys and certificates 174 may be used to perform authorization, authentication, and transmission security functions.

Figure 6:
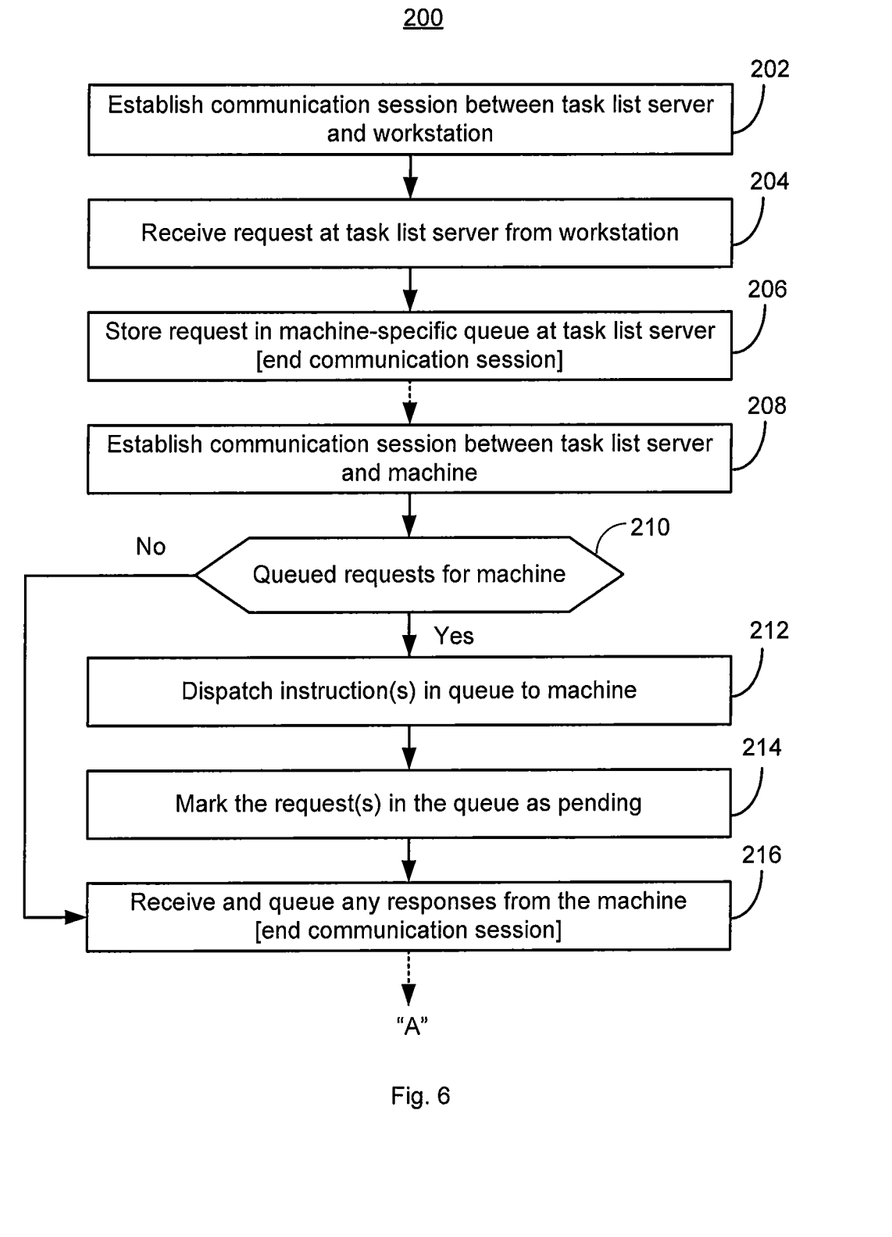
FIGS. 6 and 7 are a flow chart of an exemplary method of secure machine-to-machine communication.

FIG. 6 is a flow chart of an exemplary method 200 of secure machine-to-machine communication. The portion of the method 200 illustrated in FIG. 6 may be particularly relevant to an initial round of communication when no previous requests have been made and no responses may be pending. However, other embodiments of the method 200 may perform the steps in a slightly different order. At block 202, a communication session is established between task list server 12 and the workstation 16. The communication session may be initiated at the workstation 16 responsive to user activity at the workstation 16, for example, by connecting a browser to the web server 90. Other activities that support establishment of a communication session between the task list server 12 and the workstation 16 may also be supported.

In creating the communication session, several steps may be followed to help ensure that the session is secure. For example, a secure channel using, for example, HTTPS may first be established to prevent eavesdropping. Then, for authentication purposes, a nonce may be generated at each end and signed by the local device's private key and through a number of exchanges may be verified at the remote device using the local device's public key. Verification of the certificate containing the public key at a certificate authority (not depicted) may also be performed. Alternatively, a shared secret may be used to authenticate both parties in the communication session. Once each side has authenticated the other, authorization information such as user login credentials may be supplied by the workstation 16 and verified at the task list server 12. In an alternate embodiment, each machine 18 may have trusted user information programmed into the processing module 20, so that the task list server may save and forward some form of user authentication information during that portion of the method 200.

At block 204 the task list server 12 may receive a request from the workstation 16. Numerous kinds of requests may be supported and may include a request for a status at the machine 18 or a request for a task to be executed at the machine 18. For example, a status request may include a request for operating hours, payload information, fuel status, etc. Exemplary task or job requests may include resetting a log value, initiating a catalytic converter recharge cycle, or even downloading updates to an engine controller. Each request may have a priority assigned to the request at the time the request is created at the workstation 16. In an embodiment, the priority may be assigned or changed any time after the request is received at the task list server 12 up until the associated instruction is executed at the machine 18, given the appropriate communication session availability. Grouping of machines may also be supported to allow mass requests by a workstation 18 targeting a number of machines. In such an embodiment, the task list server 12 would have to manage each request separately due to possible differences in connectivity between the task list server 12 and individual machines.

At block 206 the task list server 12 may store the request received from the workstation 16 in a machine specific-queue at the task list server 12. In another embodiment, the request may be stored in a workstation-specific queue or even just a general delivery queue where either of the latter are reviewed upon connection with a specific machine 18. At this point, the communication session between the task list server 12 and the workstation 16 may be ended, although in some embodiments the communication session may be relatively persistent and last through several cycles of communication based on network availability and session timeout requirements. In other embodiments, certain communication session related data may be stored, such as session identifiers, so that when a communication channel is available, the communication session may be restored more quickly than negotiating a new session. However, when referred to here, ending or disconnecting a communication session is associated with completion of one or more rounds of communication and, in general, tearing down the communication session. Ending a communication session may also include a positive step taken at either the machine 18 or the workstation 16 to disconnect from a particular network, either in response completion of all pending communications or to a change in machine status that affects the ability to communicate. One example may be disconnecting a tether used for communication in preparation for transport to a worksite.

Figure 7:
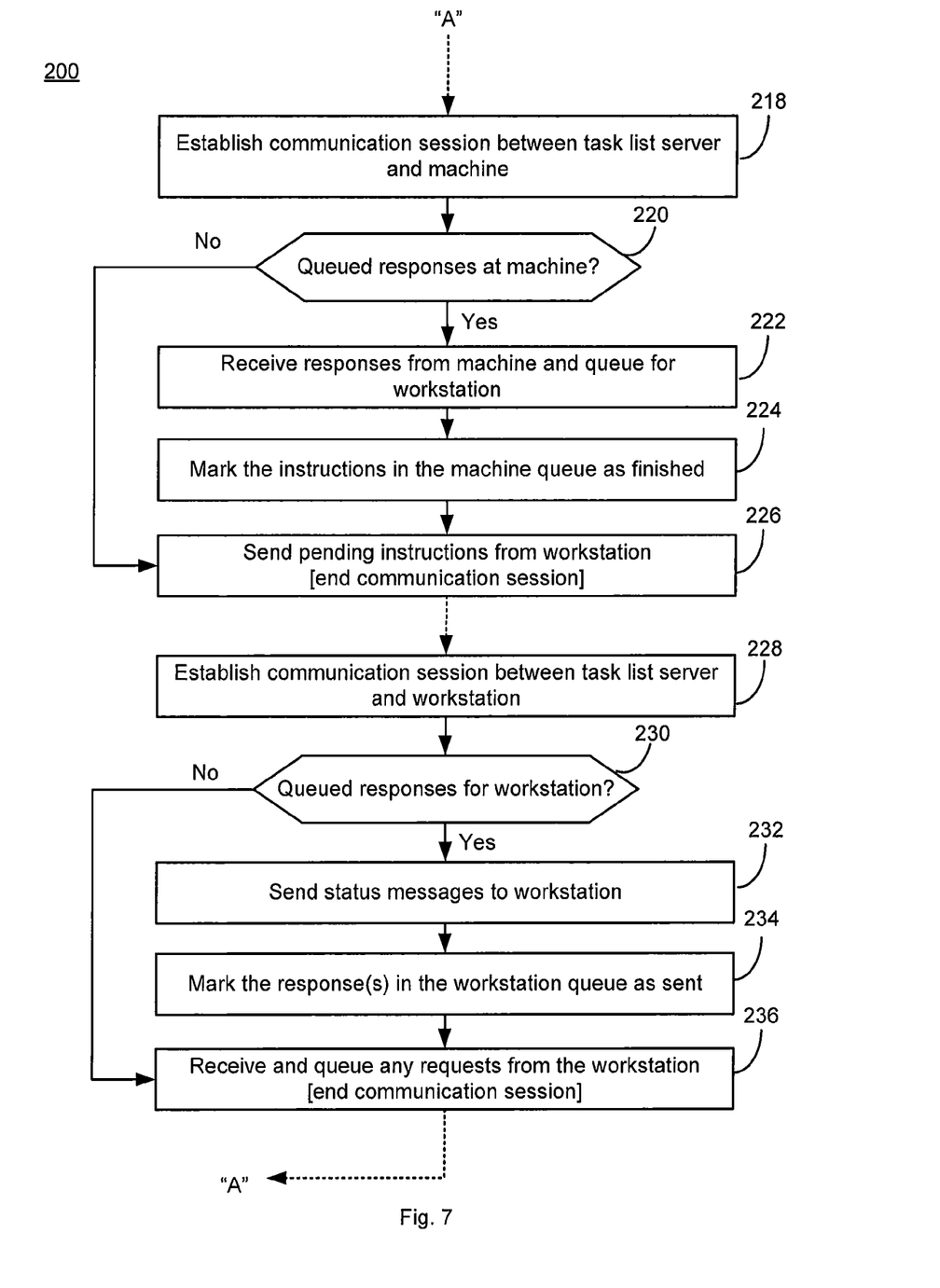

The dashed line between block 206 and block 208 and other similar dashed lines connecting blocks in FIGS. 6 and 7 are provided to indicate an asynchronous action, that is, that some passage of time may occur between the execution of the blocks or that other communication sessions may occur during this time. For example, a second communication session between the workstation 16 and the task list server 12 may occur before any communication is established between the task list server 12 and the machine 18.

At block 208, a communication session may be established between the task list server 12 and the machine 18. The communication session may be established responsive to a request from the machine 18 to establish a communication session, for example, at the completion of a workday when the machine is brought to a service center, or when a wireless connection between the machine 18 and a wireless service provider capable of supporting the session becomes available. As above, this may involve creation of a secure channel and mutual authentication. Although authorization, such as a user login, would not be expected, the machine 18 may, in some embodiments, supply additional proof of identity information beyond that used for mutual authentication.

For the processing module 20 to function autonomously, the processing module 20 must be network aware and capable of periodic testing of wireless connections (if any) to determine if any approved network becomes available. The processing module 20 may also need to be sensitive to physical network connections becoming available, for example, when the machine 18 is returned to a work center and a tether attached. The processing module 20 may be initially programmed for a particular set of networks and operating conditions and then must operate independently to establish network connections, manage priorities, determine whether instructions were completed successfully or not, report responses, and implement downloaded programming changes. Programming changes may include changes to the configuration of the processing module 20 as well as changes to components of the machine 18, such as operating limits at an engine control module (not depicted).

At block 210, the task list server 12 may check a machine-specific queue for any requests pending at the task list server for the machine 18. As discussed above, different queue configurations may be used. If, at block 210, one or more requests have been queued for the machine 18, the "yes" branch from block 210 may be taken to block 212.

At block 212, queued requests may be reformatted as necessary and dispatched to the machine 18 in the form of instructions. As noted above, the use of the terms request and instruction are semantic and used in illustrating of the concepts disclosed.

At block 214, the request in the queue may be marked as pending, indicating that the request has been dispatched to the machine 18 but that no response has been received.

At block 216, any responses or other status information pending at the machine 18 may be forwarded from the machine 18 to the task list server 12 and placed in an appropriate queue on the task list server 12. In an exemplary embodiment, responses may be stored in a queue specific to the workstation 16 that either placed the request or which has been designated by the machine 18. As to the latter, the machine 18 may generate some outbound responses that are machine initiated, such as an alarm condition. In that case, the machine 18 may designate a destination for the message. In an embodiment, the destination may be name only, such as "urgent maintenance" and the task list server 12 may resolve the name to a particular destination.

Returning to block 210, if there are no queued requests for the machine 18, the "no" branch from block 210 may be taken to block 216 and executed as described above.

The method illustrated in FIG. 6 continues at FIG. 7 as noted by the "A" designator. FIG. 7 illustrates a continuation of method 200 of FIG. 6 and may be directed to subsequent communication sessions between the task list server 12 and the endpoints, machine 18 and workstation 16.

At block 218, communication may be established between the task list server 12 and the machine 18. At block 220, a determination may be made as to whether there are responses queued at the machine 18 for uploading to the task list server 12. If so, the "yes" branch from block 220 may be taken to block 222.

At block 222, responses corresponding to request/instructions previously delivered from the task list server 12 may be uploaded to the task list server 12. At block 224, following confirmation of the receipt of the response, items in the response queue 172 of FIG. 5 may be cleared or otherwise marked as delivered. At block 226, any instructions pending at the task list server 12 may be delivered to the machine 18, and, optionally, the communication session may be ended.

If, at block 220, there are no queued responses at the machine 18, execution may take the "no" branch from block 220 to block 226, where execution continues as described above with respect to block 226.

Asynchronously to block 226, at block 228, when a network connection is available, a communication session may be established between the task list server 12 and the workstation 16 as described above.

At block 230, when responses are queued at the task list server 12 for the workstation 16, the "yes" branch may be taken to block 232. At block 232, the responses in the form of status messages may be sent to the workstation 16. At block 234, the task list server 12 may mark the queued responses as sent following confirmation of delivery. The queued responses may be deleted following delivery, but in other embodiments, the delivered responses may be archived at the task list server 12.

At block 236, any requests pending at the workstation 16 may be delivered to the task list server 12 and, as discussed above with respect to block 206, those requests may be queued for delivery to the machine 18.

INDUSTRIAL APPLICABILITY

In general, the ability to ability to asynchronously queue requests/instructions and responses/status messages between a workstation and a machine gives a new level of flexibility to machine owners, operators and other authorized parties for communication with the machine. Many worksites are inherently under construction and may not have a mature communication infrastructure in place. In other applications, such as mining, a machine may be in such a harsh communication environment that no data transfers are possible at all until the machine is physically moved to a different location, such as above ground.

Similarly, on the workstation side, modern communications equipment such as tablets and smart phones allow mobility among workers that was previously unheard of. However, even with these advances, coverage gaps, building interiors, tunnels, airplane restrictions, etc., make ubiquitous and uninterrupted communication access unachievable. Therefore, the services offered by the above-disclosed system and method may provide an important link between a human user and a machine with no user interface or, in some cases, with no user.

Unlike a simple email client, or other supervisory control and data acquisition (SCADA) equipment such as a smart electric meter, a processing module in the machine may be capable of determining network availability, establishing connections, performing authentication and authorizations as needed, and manage its own instruction queue, as well as manage collecting data and sending the data, all without human user involvement. These features allow machine diagnostics, work site information transfers, and programming changes to be accomplished, in many cases without the machine being taken out of service and without distracting an operator or on-site maintenance technician. Because a machine may have limited computational power or may have a limited number of free cycles for execution and reporting of instructions received from the task list server, the processing module benefits from the ability to manage its own queue and arrange the sequence in which instructions are performed according to an assigned priority, the date and time of the request, or other assignable criteria.

What is claimed is:

1. A system for securely communicating requests and responses between a workstation and a machine using a task list server, the system comprising:

the machine communicatively coupled to the task list server that receives, from the task list server, an instruction corresponding to a request from the workstation, the instruction being a task instruction or a status instruction corresponding to the request and develops a response to the instruction without human operator intervention; and the task list server having executable instructions that when executed by a processor of the task list server cause the task list server to:

establish a first communication session between the task list server and the workstation, the first communication session mutually authenticated and encrypted, wherein the first communication session communicates the request from the workstation to the task list server and the request includes at least one of a task request or a status request, wherein the task list server receives priority information for the request stored at the task list server; and asynchronously to the first communication session, establish a second communication session, according to the received priority information, between the task list server and the machine, the second communication session mutually authenticated and encrypted, wherein the second communication session communicates the response to the instruction to the task list server.

2. The system of claim 1, wherein the priority information is included in the request.

3. The system of claim 1, wherein the machine stores a plurality of instructions and develops the response to a particular instruction based on a priority of the instruction and within a given priority in an order from oldest to newest.

4. The system of claim 1, wherein the task list server sends a status message including a status of a previous request to the workstation.

5. The system of claim 4, wherein the status message includes information selected from a set comprising: completed successfully, failed, pending at the machine, and pending delivery to the machine.

6. The system of claim 5, wherein the task list server uses the second communication session to communicate the status message to the workstation.

7. The system of claim 1, wherein the task list server uses the second communication session to communicate the instruction to the machine.

8. The system of claim 1, wherein the task list server i) receives and stores a plurality of requests from one or more workstations, the plurality of requests directed at one or more machines, ii) receives and stores a plurality of responses from the one or more machines, and iii) presents the one or more of the plurality of responses to authorized workstations.

9. The system of claim 1, wherein the machine is directly coupled to the task list server without intervening computational nodes and the workstation is directly coupled to the task list server without intervening computational nodes.

10. A system for securely communicating requests and responses between a workstation and a machine, the system comprising:

a task list server including:

a server processor;

a communication port coupled to the server processor, the communication port supporting secure and authenticated session-based communications between the task list server and the workstation and between the task list server and the machine, the communication port configured to receive a priority level for the communications for use in prioritizing communications at the task list server;

a memory configured to store operational data, keys, and executable commands for execution on the server processor that cause the task list server to store data and communicate data traffic over the communication port; and the machine including:
a machine processor;
a machine communication port coupled to the machine processor and communicatively coupled to the communication port of the task list server;
a memory configured to store executable commands for execution on the machine processor that implement;
a communication routine that receives an instruction from the task list server;
a queue storing the instruction received from the task list server and a response to the instruction for sending to the task list server; and
a dispatch routine that causes the instruction to be executed and determines the response to the instruction.

11. The system of claim 10, wherein the machine further comprises a priority management routine that determines the priority level and a time reference for each of a plurality of instructions in the queue and causes the dispatch routine to execute each pending instruction in an order first by the priority level and second by the time reference from oldest to newest.

12. The system of claim 10, wherein the dispatch routine determines the response to the instruction as a numerical value related to execution of the instruction.

13. The system of claim 10, wherein the dispatch routine determines the response as one of completed successfully or failed.

14. The system of claim 10, wherein the machine is one of an earthmoving machine, a mining machine, and a power generation machine.

15. A method of asynchronous communication between a plurality of workstations and a plurality of machines using a task list server, the method comprising:
establishing a first communication session between the task list server and a workstation;
receiving, at the task list server, a request from the workstation, the request including at least one of a status request for a status at one or more of the plurality of machines or a job request to be executed at one or more of the plurality of machines;
receiving, at the task list server, a priority level for the request;
storing the request in a machine-specific queue at the task list server;
establishing a second communication session between the task list server and a one machine of the plurality of machines;
determining that the machine-specific queue has a stored request for the one machine;
dispatching, to the one machine, an instruction corresponding to the stored request in the queue according to the priority level;
marking the stored request in the queue as pending;
disconnecting the second communication session;
establishing a third communication session between the task list server and the one machine;
receiving from the one machine a response to the instruction;
storing the response in a workstations specific queue at the task list server; and
sending, from the task list server to an authenticated workstation, a status message corresponding to the response stored in the queue.

16. The method of claim 15, further comprising sending from the task list server to the workstation, responsive to a query from the workstation, a pending status message of the request following dispatching the instruction and before receiving the response from the machine corresponding to the instruction.

17. The method of claim 15, wherein sending the status message comprises establishing a fourth communication session between the task list server and the authenticated workstation.

18. The method of claim 15, wherein establishing the first communication session comprises creation of a secure channel, performing a mutual authentication between the task list server and the workstation and confirming login credentials associated with a user at the workstation.

19. The method of claim 15, further comprising serving a web page from the task list server to the workstation wherein the web page includes information used by a browser at the workstation to present a list of machines available for requests and a set of available requests specific to each machine in the list of machines.

20. The method of claim 15, further comprising execution of instructions in the queue in an order determined by a priority of the instruction.

* * * * *

UNITED STATES PATENT AND TRADEMARK OFFICE
CERTIFICATE OF CORRECTION

Page 1 of 1

PATENT NO. : 8,762,725 B2
APPLICATION NO. : 13/656233
DATED : June 24, 2014
INVENTOR(S) : Jorden et al.

It is certified that error appears in the above-identified patent and that said Letters Patent is hereby corrected as shown below:

In the Claims

Column 11, line 19, in Claim 10, delete "implement;" and insert -- implement: --.

Signed and Sealed this
Fifteenth Day of September, 2015

Michelle K. Lee
*Director of the United States Patent and Trademark Office*